US006823840B1

United States Patent
Tamai et al.

(10) Patent No.: US 6,823,840 B1
(45) Date of Patent: Nov. 30, 2004

(54) MANIFOLD ABSOLUTE PRESSURE CONTROL SYSTEM AND METHOD FOR A HYBRID ELECTRIC VEHICLE

(75) Inventors: Goro Tamai, West Bloomfield, MI (US); Frank Ament, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/646,558

(22) Filed: Aug. 21, 2003

(51) Int. Cl.[7] .............................................. F02D 31/00
(52) U.S. Cl. ..................................... 123/352; 123/355
(58) Field of Search .............................. 123/352, 353, 123/354, 355; 180/65.2

(56) References Cited

U.S. PATENT DOCUMENTS 6,176,556 B1 * 1/2001 Kizer .......................... 303/152
6,257,194 B1 * 7/2001 Kerns et al. ................ 123/198 D
6,274,943 B1 * 8/2001 Hasegawa et al. ........ 290/40 C
6,367,570 B1 * 4/2002 Long et al. ................. 180/65.2
6,532,944 B1 * 3/2003 Leone et al. ................ 123/520

* cited by examiner

Primary Examiner—John T. Kwon
(74) Attorney, Agent, or Firm—Christopher DeVries

(57) ABSTRACT

Methods and apparatus are provided for controlling manifold absolute pressure in a hybrid electric vehicle that includes an internal combustion engine in parallel with an electric motor/generator. The method includes the steps of monitoring the torque demand on the hybrid electric vehicle, monitoring the manifold absolute pressure magnitude and change rate of the internal combustion engine, supplying torque from the internal combustion engine to meet the torque demand; and supplying torque from the motor/generator to load-level the torque supplied from the internal combustion engine and to maintain the manifold absolute pressure of the internal combustion engine within an acceptable range and rate.

18 Claims, 4 Drawing Sheets

MANIFOLD ABSOLUTE PRESSURE CONTROL SYSTEM AND METHOD FOR A HYBRID ELECTRIC VEHICLE

FIELD OF THE INVENTION

The present invention generally relates to a method for controlling emissions, and more particularly relates to a system and method for controlling emissions in a parallel hybrid electric motor vehicle by controlling manifold absolute pressure.

BACKGROUND OF THE INVENTION

Hybrid electric vehicles achieve high fuel mileage by combining a battery-powered electric motor/generator (MG) with a highly efficient heat engine, typically an internal combustion engine (ICE). Parallel hybrid electric vehicles use power from both the heat engine and the electric engine to drive the wheels of the vehicle. This is in contrast to series hybrid electric vehicles, which only use power from the electric motor to drive the wheels, with the heat engine only acting as a generator to recharge the electric motor/generator batteries. Parallel hybrid electric vehicles are the most common hybrid electric motor vehicles, and are the focus of the present invention. By using on-board engine computer controls to vary when each engine or motor or combination of engine and motor are used, the parallel hybrid motor vehicle can achieve peak efficiency under different driving conditions. The motor/generator functions as both a motor, delivering torque through some mechanism to the drive wheels, and as a generator, powering the electrical system of the vehicle and charging the vehicle batteries. When the MG is functioning as a generator, it may either be powered by torque from the motor vehicle ICE or from the wheels of the motor vehicle.

When the internal combustion engine (ICE) in any motor vehicle is initially started (especially in a cold climate), the interior surfaces of the engine are cold. In addition, because the engine is initially turning at a very low RPM, the intake manifold absolute pressure (MAP) is near atmospheric pressure. Because liquid fuel does not combust as easily or cleanly as gaseous fuel, it is desirable that the fuel sprayed into and mixed with air traveling into the combustion cylinders of the engine be vaporized in order to reduce emissions from the ICE. Unfortunately, both the relatively high MAP and the cold condition of the engine make it difficult to vaporize the fuel injected into the combustion cylinders. Therefore, in order to produce the desired amount of power at start up and during high-torque initial accelerations shortly after start up when the engine is still cold, additional (i.e., excess) amounts of fuel must be supplied to the intake manifold to obtain a sufficient amount of vaporized fuel. All of the additional fuel is not completely vaporized and the incompletely vaporized fuel is not completely combusted. The consequence of the poor fuel vaporization at startup and during initial high-torque accelerations is increased emissions. The excess fuel that is not completely combusted at start-up and during the period shortly after start up creates an exhaust mixture that is too fuel-rich to be stoichiometric at the catalytic converter, thus leading to increased hydrocarbon and carbon monoxide emissions. If an attempt is made to decrease the emissions by not supplying the additional amounts of fuel, the engine may misfire because there is not enough fuel vapor to run correctly. If the engine misfires, in addition to providing substandard performance, not all the fuel injected into the combustion chambers burns, and the exhaust passed to the catalytic converter is again too rich to be stoichiometric. This situation also leads to increased hydrocarbon emissions.

Under most operating conditions, once the intake valves have become adequately heated, the excess fuel is no longer necessary, as the heated intake valves will properly vaporize the injected fuel. At the same time the engine RPM is also usually high enough to provide a low MAP which assists with fuel vaporization.

High emissions can result, however, not only from the high MAP at start up, but also from rapid changes in MAP even with the engine heated. When there is a rapid drop in torque demand, such as at the end of a rapid acceleration, the throttle closes and the MAP will quickly drop from the high MAP consistent with the rapid acceleration to a low MAP consistent with the lower torque demand. Any liquid fuel left in the intake ports after the throttle closes rapidly can flash to a gaseous state because of the low MAP and the hot engine components. There may be too little of this gaseous fuel to fully combust, and the fuel-air mixture may be too lean (has too much air present) to properly and completely ignite in the cylinder combustion chamber. The unburned fuel-air mixture is exhausted and passes to the catalytic converter. This unburned fuel-air mixture again leads to increases in the hydrocarbon and carbon monoxide emissions. This problem can be especially pronounced when the engine is cold, such as in the short period after startup. During this period, some of the excess fuel that has been injected into the combustion chambers can pool on the cylinder intake ports. If the MAP suddenly drops due to the throttle closing, the liquid fuel can quickly flash to a gaseous state, leading to the problems described above.

Air injection reaction (AIR) systems have been employed as one means to reduce the emissions resulting from start-up and from the driving immediately thereafter by pumping air into the exhaust ports. The injected air helps produce an exothermic reaction to increase the catalytic converter temperature. Additionally, advanced engine controls have been used to provide a more easily ignited air/fuel mixture for injection into the cylinders. An approach to controlling emissions on a motor vehicle without a hybrid power train involves the use of an electronic throttle control (ETC). An ETC has a sensor at the accelerator pedal that measures the position of the accelerator pedal, and thus how much power (or torque) is being demanded from the engine by the driver. The sensor is connected to an engine control computer which, based on signals from the accelerator pedal sensor, decides how far to open the throttle flap in the intake manifold, thereby determining the amount of power the engine produces. Under normal operating conditions, the engine control computer immediately opens or closes the throttle in order to obtain the desired engine. The engine control computer may, however, be programmed to slow the opening or closing of the throttle in order to avoid a high-emissions situation that can result from opening or closing the throttle too quickly, as described above. Problems exist, however, with all of these approaches. The AIR system is only used for less than a minute at start-up of the motor vehicle and has no function thereafter in the operation of the motor vehicle. The AIR system adds weight and complexity (and thus cost) to the motor vehicle and yet is only functionally necessary for a short period of time at cold start up. The advanced engine controls also add complexity and cost to the motor vehicle. The first two methods help primarily with reducing start-up and initial emissions and are largely unable to reduce emissions in other driving situations such as conditions resulting in rapid changes in MAP. The method involving the use of an ETC can help reduce emissions based on rapid changes in MAP but may reduce responsiveness of the engine to driver inputs, as torque output from the engine is slowly increased or decreased in order to avoid high emissions.

Accordingly, a need exists for a method to control emissions in a parallel hybrid electric motor vehicle that overcomes the deficiencies of the prior art techniques without sacrificing vehicle performance. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A system is provided for controlling manifold absolute pressure in an internal combustion engine of a hybrid electric vehicle. The system includes an internal combustion engine, an electric motor/generator, and a control unit. The control unit is coupled to the internal combustion engine and to the electric motor/generator and is configured to control the torque supplied by the internal combustion engine and by the electric motor/generator to meet the vehicle total torque demand and to maintain the manifold absolute pressure and the rate of change of the manifold absolute pressure measured in the intake manifold of the internal combustion engine within acceptable emission control limits.

In accordance with a further embodiment of the invention, a method is provided for controlling manifold absolute pressure in a hybrid electric vehicle that includes an internal combustion engine in parallel with an electric motor/generator. The method includes the steps of monitoring the torque demand on the hybrid electric vehicle, monitoring the manifold absolute pressure of the internal combustion engine, supplying torque from the internal combustion engine to meet the torque demand; and supplying torque from the motor/generator to load-level the torque supplied from the internal combustion engine and to maintain the manifold absolute pressure of the internal combustion engine within an acceptable range.

BRIEF DESCRIPTION OF THE DRAWINGS

The present invention will hereinafter be described in conjunction with the following drawing figures, wherein like numerals denote like elements, and wherein FIG. 1 schematically illustrates a parallel hybrid manifold absolute pressure control system in accordance with an embodiment of the invention.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In accordance with an embodiment of the invention, a manifold absolute pressure control system is provided for use in a parallel hybrid electric vehicle. The parallel hybrid electric vehicle includes an energy storage system such as a battery-pack operated electric propulsion/generating system (such as an electric motor/generator) coupled in parallel with a combustion propulsion system (such as an internal combustion engine). For ease of description, but without limitation, the electric propulsion/generator system and the combustion propulsion system will hereafter be referred to as an electric motor/generator (MG) and an internal combustion engine (ICE), respectively. The control system in accordance with an embodiment of the invention load-levels the internal combustion engine and thereby controls both the magnitude and the rate of change of manifold absolute pressure (MAP) measured in the intake manifold of the internal combustion engine, thereby reducing hydrocarbon emissions. The control system controls the operation of both the electric motor/generator and the internal combustion engine, operating the electric motor/generator in parallel with the internal combustion engine in a manner such that the MG supplements the torque supplied by the ICE to meet the vehicle torque demand, but does so in such a way that the ICE is able to operate in an ideal, environmentally acceptable, low emission MAP range.

Figure 1:
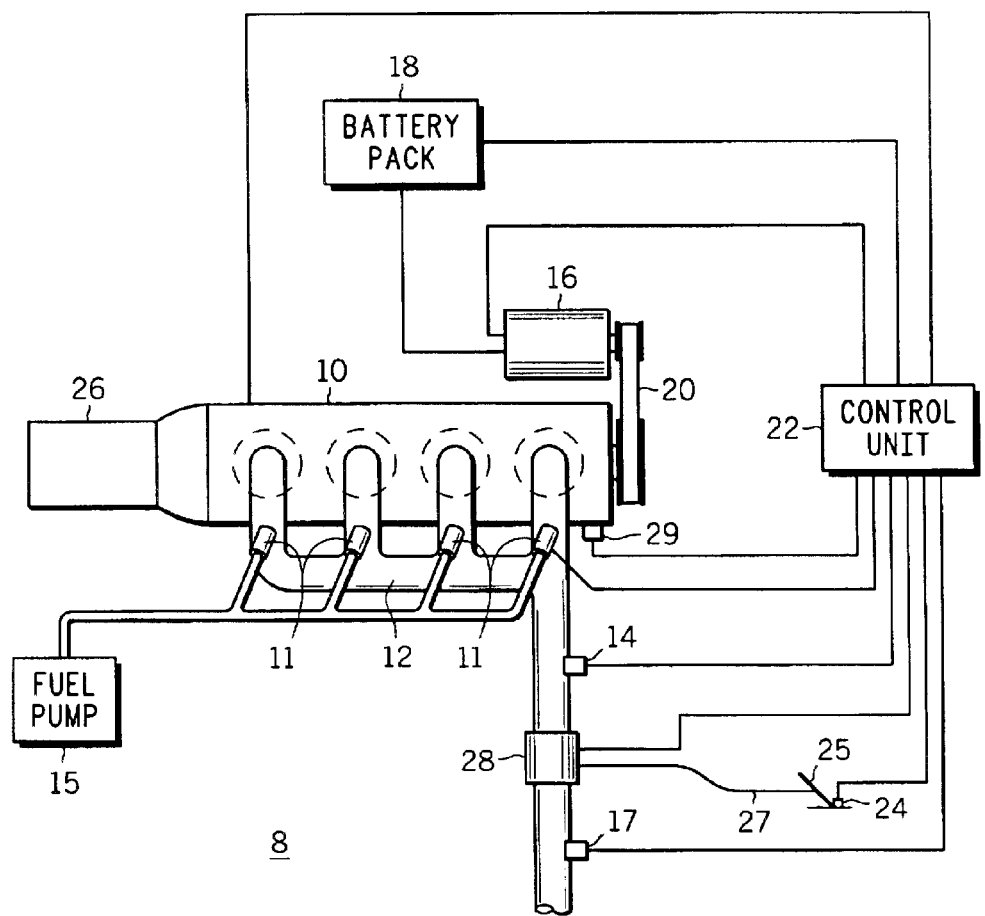

FIG. 1 schematically illustrates a drive train 8 of a parallel hybrid electric vehicle including a manifold absolute pressure control system in accordance with an embodiment of the invention. The hybrid electric vehicle includes an internal combustion engine (ICE) 10 coupled in parallel with a motor/generator (MG) 16. A control unit 22 controls the operation of both the internal combustion engine and the motor/generator to supply the torque demanded of the vehicle in a low emissions manner in accordance with a method of the invention to be explained more fully below. Control unit 22 may be, for example, a stand alone processor, a microcontroller unit, a portion of the engine control unit, or the like. The control unit can be programmed, based on either or both experimental and modeling results, to perform the functions set forth in detail below. Programming the control unit in such manner will be apparent to those of skill in the art.

An intake manifold 12 conveys air to each cylinder of internal combustion engine 10. In accordance with the illustrated embodiment, ICE 10 is a four cylinder engine, although the invention is applicable to an ICE with a greater or lesser number of cylinders. Four fuel injectors 11 are provided inside the intake manifold, with each fuel injector positioned proximate the intake port of one of the four cylinders. A fuel pump 15 delivers fuel to fuel injectors 11 through appropriate fuel lines. A pressure sensor 14 is located inside intake manifold 12 to provide measurements of the manifold absolute pressure (MAP) in the intake manifold. An intake air temperature sensor 17 measures the temperature of the incoming intake air, and an engine coolant temperature sensor 29 measures the temperature of the engine coolant in ICE 10. A throttle flap 28 controls the amount of air allowed to pass through intake manifold 12 to each individual cylinder of the internal combustion engine. The throttle flap is configured in conventional manner to rotate through a ninety degree arc within the intake manifold, from a 'closed' position perpendicular to the air stream flow that completely blocks air flow, to an 'open' position parallel to the air stream flow that allows an unrestricted air flow. The throttle flap is coupled, either physically or electronically, to an accelerator pedal 25. The degree to which throttle flap 28 is open is determined by the position of accelerator pedal 25 and, in accordance with an embodiment of the invention, by control unit 22. For example, the throttle flap may be physically coupled to the accelerator pedal by a throttle cable 27. Pushing accelerator pedal 25 causes cable 27 to pull throttle flap 28 open. The internal combustion engine is coupled to a transmission 26 which, in turn, is coupled to the drive wheels (not illustrated) of the hybrid vehicle. The ICE delivers power to the drive wheels through transmission 26.

Electric motor/generator (MG) 16 draws power from a battery pack 18 and is connected to ICE 10 by coupling 20. Coupling 20 may be, for example, a system of gears, a belt drive, or the like. Coupling 20 alternatively allows the electric motor/generator to act as a starter motor for ICE 10, or for the MG to provide power to transmission 26 in parallel with ICE 10, or for MG 16 to be driven by ICE 10 in order for the MG to function as a generator for battery pack 18.

Control unit 22 is configured to send and receive a number of communicatory signals in order to properly operate the inventive control system. Control unit 22 receives communicatory signals from pressure sensor 14, intake air temperature sensor 17, and engine coolant temperature sensor 29, sends communicatory signals to fuel injectors 11, and sends and receives communicatory signals to and from ICE 10, throttle flap 28, battery pack 18, and electric motor/generator 16. Additional sensors (not illustrated) also measure speed of the hybrid vehicle and the rotations per minute (RPM) of ICE crankshaft 23. Another sensor determines which gear transmission 26 is in. Each of these additional sensors also sends communicatory signals to control unit 22. Based on these three additional inputs and the degree to which throttle flap 28 is open (or alternatively, the response of a pedal position sensor 24 in an electronic throttle control system), control unit 22 is able to calculate the total desired crankshaft output torque. The desired crankshaft output torque is a function of the present operating conditions of the vehicle and the demands of the driver/operator as conveyed through the accelerator pedal. Control unit 22 is configured to control the frequency and length of the fuel pulse width as injected by the fuel injectors as well as to trim the degree to which throttle flap 28 is open in order to make ICE 10 produce the desired amount of torque. The control unit is programmed to calculate the volume of air passing through intake manifold 12 based on the degree to which the throttle flap is open. By adjusting the frequency and pulse width of the fuel injectors to match the volume of incoming air from the intake manifold, the control unit is able to create a fuel/air mixture that meets engine demand and, in accordance with the invention, is also highly efficient and low in emissions. As is explained more fully below, the control unit also controls the amount of power electric motor/generator 16 provides ICE 10 through coupling 20, and the amount of power MG 16 draws from ICE 10 when the MG is acting as a generator.

Figure 2:
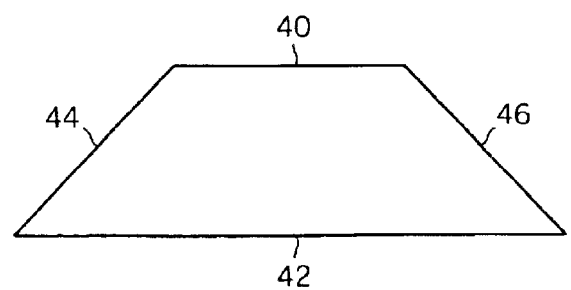
FIG. 2 schematically represents the allowable manifold absolute pressure range.

The inventors have determined that emissions from the hybrid electric vehicle can be kept within acceptable limits if the manifold absolute pressure and the rate of change of manifold absolute pressure as measured in the intake manifold of the internal combustion engine can be controlled and maintained within certain limits, especially during startup (when the engine is cold) and during high-torque change situations either during or following startup. A high manifold absolute pressure (MAP) or a rate of increase in MAP which exceed calculated maximums prevent injected fuel from vaporizing properly. As a consequence, the fuel is unable to burn properly in the combustion chamber. A low MAP which is below a calculated minimum pressure, or a rate of decrease in MAP which exceeds a calculated maximum rate of decrease in pressure, causes injected fuel to combust poorly or flash to a gaseous state too quickly and to pass through the combustion chamber without combusting or without combusting completely. In both cases, the incomplete combustion of the fuel leads to an unburned or non-stoichiometric mixture of fuel and air at the catalytic converter, and thus leads to higher emissions. FIG. 2 schematically represents the allowable manifold absolute pressure range and the allowable range of rate of increase or decrease in the manifold absolute pressure for a given ICE operating temperature. The term "allowable" means that fuel injected under these conditions would properly vaporize and would be properly combusted, leading to environmentally acceptable emissions levels. Horizontal line 40 represents the maximum manifold absolute pressure, horizontal line 42 represents the minimum manifold absolute pressure, line 44 represents the maximum manifold absolute pressure increase rate, and line 46 represents the maximum manifold absolute pressure decrease rate. Both the allowable MAP magnitude and allowable rate of MAP change depend on many engine conditions, including but not limited to engine temperature, intake air temperature, and fuel pulse width and frequency.

In accordance with an embodiment of the invention, control unit 22 operates motor/generator 16 and internal combustion engine 10 in a manner to supply the demanded vehicle torque while maintaining the internal combustion engine operating within the allowable MAP range. The control unit models the requested vehicle tractive effort (vehicle torque demand) based on the driver input as represented by accelerator pedal position and change in accelerator pedal position, vehicle speed, transmission gear, and crankshaft RPM. At the same time, the total requested torque is compared to the maximum torque that can be produced by the internal combustion engine while maintaining allowable MAP values. During acceleration, if the requested total vehicle torque or the total vehicle torque rate of increase at the given RPM requires a MAP or a rate of change of MAP that is greater than the boundaries illustrated in FIG. 2, positive motor/generator torque is coupled in parallel with the torque produced by the ICE to boost the net crankshaft torque produced by the hybrid drive train. The electric motor/generator supplements the ICE torque in such a way that the ICE operates in an ideal, low emission MAP range.

High emissions can also result when the torque demand changes suddenly from high demand (such as during acceleration) to low demand (such as right after acceleration). Suddenly closing the throttle in order to decrease the ICE output torque can result in a drastically lowered MAP such that any fuel remaining in the intake manifold flashes to a gaseous state, passing through the combustion chamber mostly unburned and resulting in higher emissions. In accordance with an embodiment of the invention, instead of rapidly closing the throttle flap (and increasing emissions), control unit 22 causes the throttle to close slowly so that the torque produced by the ICE does not rapidly decrease. The control unit causes the excess ICE torque to be diverted to powering the MG though coupling 20 (making the MG function as a generator). That is, if during a deceleration the requested torque (engine braking) or rate of torque decrease dictate a MAP or a rate of MAP decrease that is outside the boundaries illustrated in FIG. 2, negative electric motor/generator torque is coupled in parallel with the torque produced by the ICE. The internal combustion engine thus turns the motor/generator and the MG functions as a generator, charging battery pack 18. The motor/generator increases the positive load on the ICE to maintain the MAP within allowable limits. Thus in accordance with the invention, the control unit continually monitors operating and environmental conditions and calculates a proper combination of ICE torque and MG torque (either additive or loading) to meet the torque demand while maintaining MAP values that still allow for proper fuel vaporization.

Initially, in accordance with one embodiment of the invention, the control unit measures engine coolant temperature (as a measure of engine temperature) and electric motor/generator and battery pack diagnostics. As long as the engine coolant temperature is below a pre-determined temperature and the electric/generator and battery pack diagnostics are within operating parameters, the MG supplements the torque that the internal combustion engine is called upon to provide so that the manifold absolute pressure remains in a predetermined and allowable MAP range. The electric motor/generator and internal combustion engine together provide enough combined torque to meet the torque demanded by the driver of the vehicle. The limited MAP range within which the ICE is constrained to operate provides for adequate vaporization of fuel injected into the combustion chambers of the internal combustion engine even under cold engine conditions so that the cold start engine emissions are controlled. As soon as the engine coolant reaches a pre-determined temperature (indicating that the ICE is at a temperature that is sufficiently high to vaporize any fuel injected into the ICE cylinders even under high MAP conditions), the electric motor/generator stops supplementing ICE torque based on MAP magnitude, and the control unit may enter a more conventional hybrid electric control mode. During and after this time period, in accordance with a further embodiment of the invention, the control unit also regulates throttle opening and torque from the electric motor/generator in order to avoid rapid MAP changes that may result in high emissions.

Figure 3:
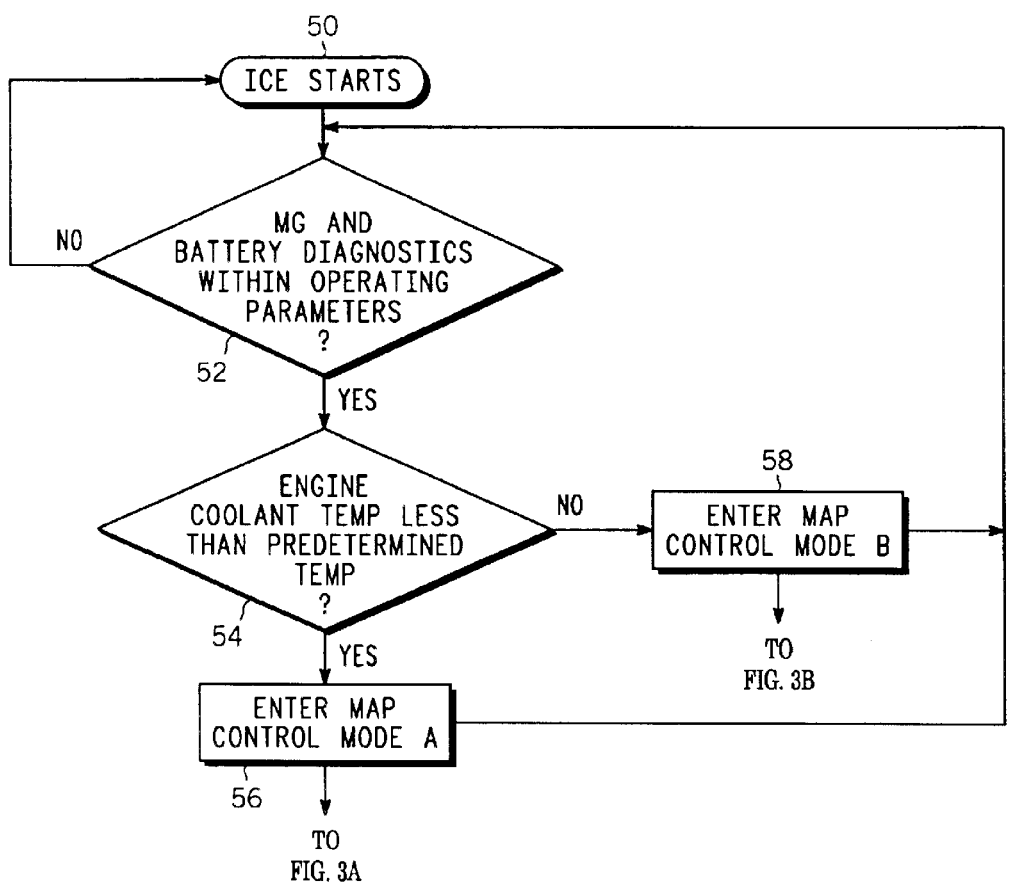
FIG. 3 schematically illustrates, in flow chart format, a process in accordance with an embodiment of the invention for controlling manifold absolute pressure in the intake manifold of an internal combustion engine.

FIG. 3 illustrates, in flow chart format, a process for controlling manifold absolute pressure in a hybrid electric vehicle in accordance with one embodiment of the invention. When internal combustion engine 10 is started, that is when the cylinders begin receiving fuel and begin combusting (step 50), control unit 22 begins a checking cycle. The control unit first checks, based on signals from MG 16 and battery pack 18, to determine whether the electric motor/generator and battery pack diagnostics are within operating parameters (step 52). The diagnostics include, for example, MG temperature, battery pack temperature, battery state of charge (SOC), and the like. If the electric motor/generator diagnostics are not within operating parameters, the control unit does not enter a MAP control mode in accordance with the invention, but does continue checking the electric motor/generator diagnostics until they are within operating conditions. If the electric motor/generator diagnostics are within operating parameters, then the control unit proceeds to enter a MAP control mode. To decide which control mode to use, control unit 22 checks, based on signals from engine coolant temperature sensor 29, whether or not the engine temperature is above a predetermined temperature (step 54). If the engine coolant temperature is below a predetermined temperature, then the control unit enters a MAP control mode A (step 56). If the engine coolant temperature is above a predetermined temperature, then the control unit enters a MAP control mode B (step 58). As explained above, if the engine temperature is above a certain predetermined operating temperature, the internal surfaces (valves and intake manifold) are sufficiently heated to vaporize any injected fuel so that high MAP values do not cause unacceptably high hydrocarbon emissions. Thus, in accordance with an embodiment of the invention, the MAP control system enters either Mode A or Mode B depending on engine temperature. Control unit 22 continues to monitor the electric motor/generator diagnostics and engine coolant temperature. For example, if ICE 10 is initially started from a cold start, control unit 22 initially enters control mode A (assuming the electric motor/generator diagnostics are within operating parameters). After ICE 10 is operated for a sufficient time to heat to a temperature greater than the predetermined temperature, control unit 22 shifts to control mode B when the control unit senses that the engine is above the predetermined temperature (again, assuming that the electric motor/generator diagnostics remain within operating parameters).

MAP control mode A attempts to maintain the manifold absolute pressure of the internal combustion engine between acceptable maximum and minimum limits, and to restrict the rate of change of manifold absolute pressure to acceptable maximum rates. MAP control mode B attempts only to limit the maximum rate of change of MAP. The acceptable limits on MAP and the acceptable maximum rate of change in MAP are those values that produce environmentally acceptable low hydrocarbon emissions.

Figure 3A:
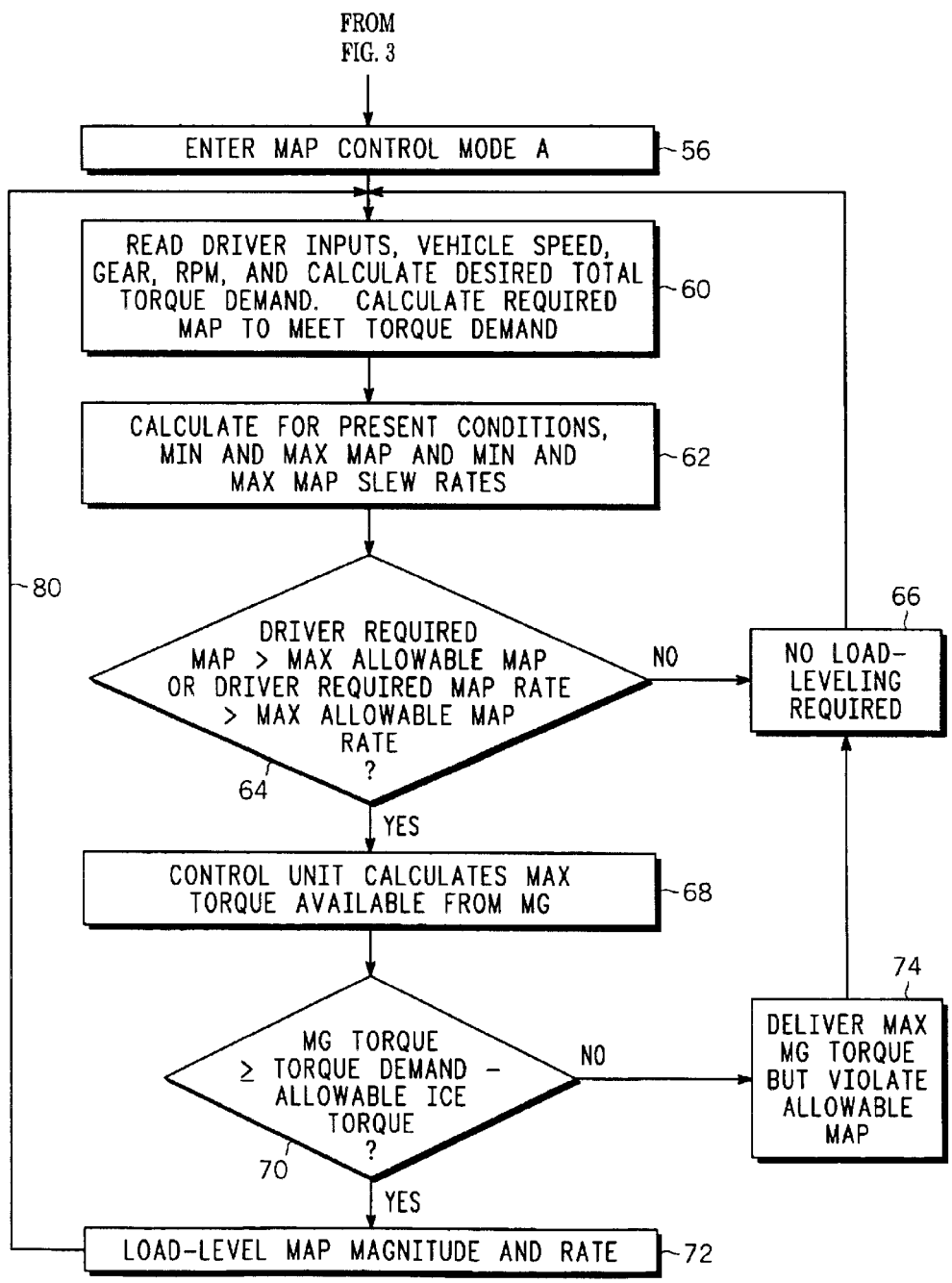

FIG. 3A illustrates the steps followed if the engine operating temperature is below the predetermined temperature and control unit 22 enters MAP control mode A. Control unit 22 receives signals from the various engine sensors, determines the position of throttle flap 28, the position of accelerator pedal 25, vehicle speed, crankshaft RPM, and transmission gear, and calculates the total desired crankshaft torque based on these sensed conditions. The control unit also calculates the manifold absolute pressure and the rate of increase or decrease in manifold absolute pressure, based on the current engine temperature and intake air temperature that would result if the ICE provided this amount of torque (step 60). Control unit 22 then calculates the maximum and minimum allowable MAP and the maximum allowable rate of MAP increase or decrease (i.e., that still provides for proper, low-emission fuel combustion) based upon engine temperature, intake air temperature, and the like (step 62). Next, the control unit calculates whether the MAP or the rate of change in MAP required to provide the desired torque is outside the just calculated allowable MAP range (step 64). If the required MAP is within the MAP operating range, no electric motor/generator load-leveling is required (step 66). The control unit opens or closes the throttle flap and adjusts the fuel injector pulse width, insuring that the ICE cylinders have the proper fuel/air mixture needed to produce the desired torque. If the required MAP or rate of change of MAP is not within the acceptable operating range, load-leveling is required. The control unit calculates, based on current electric motor/generator diagnostics, the maximum positive torque MG 16 can provide the ICE if the MG is to act as a motor or the maximum negative torque the MG can load on the ICE if the MG is to act as a generator (step 68). The control unit determines whether the torque available from the electric motor/generator is greater than the difference between the requested drive train torque and the torque the ICE is capable of providing while remaining within an allowable MAP range (step 70). This difference in torque is the torque necessary to load-level the ICE. If the torque (positive or negative) the MG is capable of providing the ICE is greater than the torque necessary to load-level the ICE, the control unit causes the MG to supply the ICE (through coupling 20) with whatever amount of torque is necessary to load-level the engine and keep the ICE MAP within the allowable range (step 72). At the same time, the control unit adjusts the throttle flap and the fuel injector pulse width, insuring that the ICE cylinders have the proper fuel/air mixture necessary to produce the desired torque. The control unit also monitors MAP through pressure sensor 14 and constrains the throttle flap opening when the MAP pressure limit is reached. If the torque demand or the rate of torque demand on ICE is such that the allowable rate of change of MAP could be violated in order to produce the desired torque, the control unit limits the opening or closing of the throttle flap to the maximum possible that does not cause the MAP to change at a rate that exceeds the allowable MAP rate of change. If, however, the torque from the electric motor/generator is less than the torque necessary to load-level the ICE, or the MG cannot provide torque quickly enough, in accordance with one embodiment of the invention, control unit causes the MG to provide the maximum torque or maximum torque change and allows the allowable MAP range to be violated in order to satisfy the driver torque request (74). The manifold absolute pressure control method in accordance with the invention is continuous. Control unit 22 continues to monitor engine and environmental conditions and driver requests on a continuous basis as indicated by arrow 80.

Figure 3B:
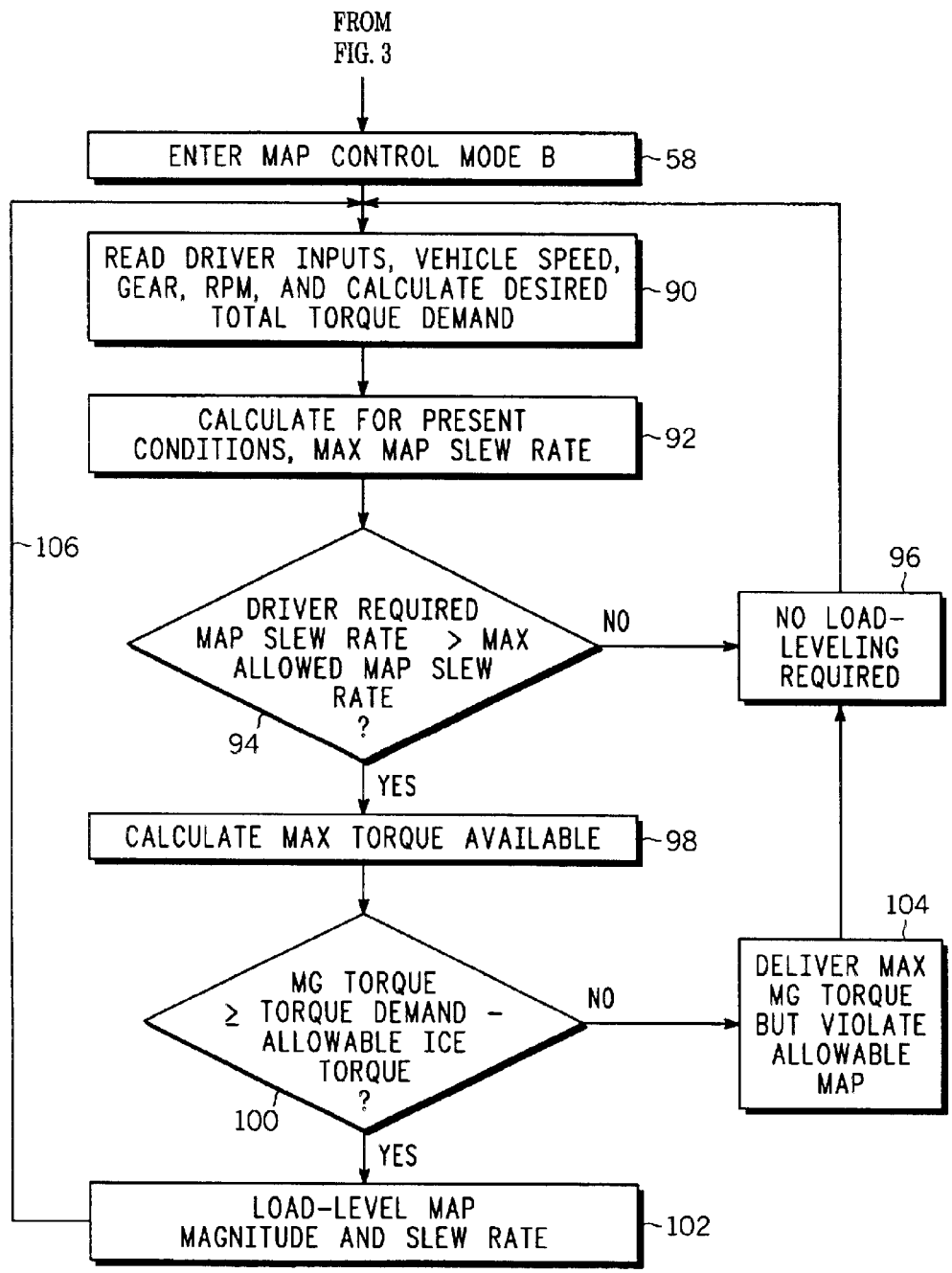

FIG. 3B illustrates the steps followed if the engine operating temperature is above the predetermined temperature and control unit 22 enters MAP control mode B. Control unit 22 receives signals from the various engine sensors, determines the position of throttle flap 28, the position of accelerator pedal 25, vehicle speed, crankshaft RPM, and transmission gear, and calculates the total desired crankshaft torque based on these sensed conditions. The control unit also calculates the rate of increase or decrease in manifold absolute pressure, based on the current engine temperature and intake air temperature that would result if the ICE provided this amount of torque (step 90). Control unit 22 then calculates the maximum allowable rate of MAP increase or decrease (i.e., that still provides for proper, low-emission fuel combustion) based upon engine temperature, intake air temperature, and the like (step 92). Next, the control unit calculates whether the rate of change in MAP required to provide the desired torque is outside the just calculated allowable MAP range (step 94). If the required rate of change in MAP is within the MAP operating range, no electric motor/generator load-leveling is required (step 96). The control unit opens or closes the throttle flap and adjusts the fuel injector pulse width, insuring that the ICE cylinders have the proper fuel/air mixture needed to produce the desired torque. If the required rate of change of MAP is not within the acceptable operating range, load-leveling is required. The control unit calculates, based on current electric motor/generator diagnostics, the maximum positive torque MG 16 can provide the ICE if the MG is to act as a motor or the maximum negative torque the MG can load on the ICE if the MG is to act as a generator (step 98). The control unit determines if the torque available from the electric motor/generator is greater than the difference between the requested drive train torque and the torque the ICE is capable of providing while remaining within an allowable MAP range (step 100). This difference in torque is the torque necessary to load-level the ICE. If the torque (positive or negative) the MG is capable of providing the ICE is greater than the torque necessary to load-level the ICE, the control unit causes the MG to supply the ICE (through coupling 20) with whatever amount of torque is necessary to load-level the engine and keep the ICE MAP within the allowable range (step 102). At the same time, the control unit adjusts the throttle flap and the fuel injector pulse width, ensuring that the ICE cylinders have the proper fuel/air mixture necessary to produce the desired torque. If the torque demand or the rate of torque demand on the ICE is such that the allowable rate of change of MAP could be violated in order to produce the desired torque, the control unit limits the opening or closing of the throttle flap to the maximum possible that does not cause the MAP to change at a rate that exceeds the allowable MAP rate of change. If, however, the torque from the electric motor/generator is less than the torque necessary to level the ICE, or the MG cannot provide torque quickly enough, in accordance with one embodiment of the invention, control unit causes the MG to provide the maximum torque or maximum torque change and allows the allowable MAP range to be violated in order to satisfy the driver torque request (104). The manifold absolute pressure control method in accordance with the invention is continuous. Control unit 22 continues to monitor engine and environmental conditions and driver requests on a continuous basis as indicated by arrow 106.

While various exemplary embodiments have been presented in the foregoing detailed description of the invention, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in the exemplary embodiments without departing from the scope of the invention as set forth in the appended claims.

We claim:

1. A method for controlling manifold absolute pressure in a hybrid electric vehicle comprising an internal combustion engine in parallel with an electric motor/generator, the method comprising the steps of:
   monitoring the torque demand on the hybrid electric vehicle;
   monitoring the manifold absolute pressure of the internal combustion engine;
   supplying torque from the internal combustion engine to meet the torque demand; and
   supplying torque from the motor/generator to load-level the torque supplied from the internal combustion engine and to maintain the manifold absolute pressure of the internal combustion engine within an acceptable range.

2. The method of claim 1 further comprising the step of measuring the operating temperature of the internal combustion engine.

3. The method of claim 2 wherein the step of supplying torque from the motor/generator comprises the step of maintaining the manifold absolute pressure between a preselected maximum pressure value and a preselected minimum pressure value and the rate of change of manifold absolute pressure less than a preselected rate of change if the operating temperature is below a predetermined temperature value.

4. The method of claim 2 wherein the step of supplying torque from the motor/generator comprises the step of maintaining the rate of change of manifold absolute pressure less than a preselected rate of change if the operating temperature is above a predetermined temperature value.

5. The method of claim 1 wherein the step of supplying torque from the motor/generator comprises the step of supplying a positive torque to supplement the torque supplied by the internal combustion engine.

6. The method of claim 1 wherein the step of supplying torque from the motor/generator comprises the step of supplying a negative torque in opposition to the torque supplied by the internal combustion engine to limit the rate of change of the manifold absolute pressure.

7. The method of claim 6 wherein the step of supplying torque from the internal combustion engine comprises the step of supplying torque from the internal combustion engine at a level greater than needed to meet the torque demand on the hybrid electric vehicle.

8. A system for controlling manifold absolute pressure in an internal combustion engine of a hybrid electric vehicle comprising:

a combustion propulsion system;

an electric propulsion/generator configured to operate in parallel with the combustion propulsion system; and an engine control unit coupled to the combustion propulsion system and to the electric propulsion/generator and configured to control the torque supplied by the combustion propulsion system and by the electric propulsion/generator to meet a total vehicle torque demand and to maintain the manifold absolute pressure and the rate of change of the manifold absolute pressure measured in the intake manifold of the combustion propulsion system within acceptable emission control limits.

9. The system of claim 8 wherein the combustion propulsion system comprises an internal combustion engine.

10. The system of claim 9 wherein the electric propulsion/generator comprises an electric motor/generator.

11. The system of claim 10 wherein the engine control unit comprises an engine control unit configured to control the torque supplied by the internal combustion engine in response to the signals from the plurality of sensors.

12. A method for controlling the manifold absolute pressure in a hybrid electric vehicle comprising an internal combustion engine in parallel with an electric motor/generator, the method comprising the steps of:

monitoring the temperature of the internal combustion engine;

monitoring the torque demand of the hybrid electric vehicle;

determining an environmentally acceptable range of manifold absolute pressure and of rate of change of manifold absolute pressure as measured in the intake manifold of the internal combustion engine in response to the monitored temperature;

determining the maximum torque that is supplied by the internal combustion engine without exceeding the environmentally acceptable range of manifold absolute pressure and the rate of change of manifold absolute pressure;

determining the maximum torque that is supplied by the electric motor/generator, determining whether the maximum torque that is supplied by the electric motor/generator is greater than or equal to the difference between the torque demand and the maximum torque that is supplied by the internal combustion engine without exceeding the environmentally acceptable range of manifold absolute pressure and the rate of change of manifold absolute pressure; and supplementing torque supplied by the internal combustion engine with torque supplied by the electric motor/generator to supply the vehicle torque demand.

13. The method of claim 12 wherein the step of supplementing torque supplied by the internal combustion engine with torque supplied by the electric motor/generator comprises the step of supplying a positive torque from the electric motor/generator.

14. The method of claim 13 wherein the step of supplementing torque supplied by the internal combustion engine with torque supplied by the electric motor/generator comprises the step of supplying a positive torque from the electric motor/generator to avoid exceeding a maximum allowable manifold absolute pressure or a maximum allowable rate of increase of manifold absolute pressure.

15. The method of claim 12 wherein the step of supplementing torque supplied by the internal combustion engine with torque supplied by the electric motor/generator comprises the step of supplying a negative torque from the electric motor/generator in opposition to the torque supplied by the internal combustion engine to maintain manifold, absolute pressure or rate of decrease of manifold absolute pressure above minimum allowable values.

16. The method of claim 12 wherein the step of determining an environmentally acceptable range comprises the step of determining a maximum rate of change of manifold absolute pressure and a maximum manifold absolute pressure and a minimum manifold absolute pressure as a function of engine temperature between which fuel injected into a cylinder of the internal combustion engine will be combusted in an environmentally acceptable manner.

17. The method of claim 12 wherein the step of supplementing comprises the step of supplementing torque supplied by the internal combustion engine with torque supplied by the electric motor/generator to supply the vehicle torque demand without exceeding the environmentally acceptable range of manifold absolute pressure and the rate of change of manifold absolute pressure as measured in the intake manifold of the internal combustion engine.

18. The method of claim 12 wherein the step of supplementing comprises the steps of:

supplementing the torque supplied by the internal combustion engine with the maximum torque available from the electric motor/generator in response to determining that the maximum torque that is supplied by the electric motor/generator is less than the difference between the torque demand and the maximum torque; and supplying torque from the internal combustion engine in excess of the maximum torque that is supplied by the internal combustion engine without exceeding the environmentally acceptable range of manifold absolute pressure and the rate of change of manifold absolute to meet the torque demand.

* * * * *